United States Patent [19]

Hamm et al.

[11] Patent Number: 4,925,826

[45] Date of Patent: May 15, 1990

[54] METHOD OF PRODUCING AN ADSORBENT FROM BLOATING MINERALS AND CALCIUM SULFATE HEMIHYDRATE

[75] Inventors: Heiner Hamm, Würzburg; Peter Hartmann, Mainbernheim; Karl-Heinz Kampner, Embsen; Hans-Friedrich Kurandt, Lüneburg, all of Fed. Rep. of Germany

[73] Assignees: Firma Gipswerk Embsen GmbH & Co. Baustoffproduktion KG, Lüneburg; Firma Gebr. Knauf Westdeutsche Gipswerke, Iphofen, both of Fed. Rep. of Germany

[21] Appl. No.: 184,889

[22] Filed: Apr. 22, 1988

[30] Foreign Application Priority Data

Apr. 24, 1987 [DE] Fed. Rep. of Germany ....... 3713742

[51] Int. Cl.$^5$ .............................................. B01J 20/10
[52] U.S. Cl. ...................................... 502/407; 502/410; 119/1
[58] Field of Search ...................... 502/407, 410; 119/1

[56] References Cited

U.S. PATENT DOCUMENTS

| | | |
|---|---|---|
| 3,029,783 | 4/1962 | Sawyer, Jr. et al. .................. 119/1 |
| 3,425,397 | 2/1969 | Schulein et al. ....................... 119/1 |
| 4,159,008 | 6/1979 | Bavaveas ............................... 119/1 |
| 4,203,388 | 5/1980 | Cortigene et al. .................... 119/1 |
| 4,278,047 | 7/1981 | Lucá119 .................................. 1/ |
| 4,409,925 | 10/1983 | Brundrett et al. .................... 119/1 |
| 4,459,368 | 7/1984 | Jaffee et al. ........................... 119/1 |
| 4,570,573 | 2/1986 | Lohman ................................. 119/1 |

FOREIGN PATENT DOCUMENTS 3503803 8/1986 Fed. Rep. of Germany ...... 502/410

*Primary Examiner*—Carl F. Dees
*Attorney, Agent, or Firm*—Fleit, Jacobson, Cohn, Price, Holman & Stern

[57] ABSTRACT

The invention relates to a method of producing an adsorbent where an expanded granular bloating mineral and calcium sulfate hemihydrate are mixed to form a granulated material where the calcium sulfate hemihydrate is converted in toto into calcium sulfate dihydrate by the addition of a surplus of water, and where the free water is removed by drying. It is desirable that the proportion of bloating mineral be reduced, that the adsorption effect be substantially retained and the hardness of the adsorbent be increased without any additives. This is accomplished by mixing calcium sulfate hemihydrate and bloating mineral in such proportion that a weight ratio of calcium sulfate: bloating minerals > 5:1 and up to 10:1 exists in the adsorbent, in that mixing is effected by calcium sulfate hemihydrate and the bloating mineral being poured together into a tank and mixed there together by a stirring tool to form a granulated mixture, in that the granulated mixture after the addition of the water and before drying is allowed a retention time of at least 4 minutes, and in that the dry calcium sulfate dihydrate is converted by calcining at 120°–150° C. in such a proportion into calcium sulfate hemihydrate that the adsorbent has a total water content of 1% by weight to 16% by weight. The adsorbent produced in this manner comprises, on the one hand, open-pore smaller particles which consist only of calcium sulfate and, on the other hand, open-pore larger particles where a bloating mineral core is coated with calcium sulfate.

9 Claims, No Drawings

METHOD OF PRODUCING AN ADSORBENT FROM BLOATING MINERALS AND CALCIUM SULFATE HEMIHYDRATE

This invention relates to a method of producing an adsorbent, typically for animal excretions, from a bloating mineral and calcium sulfate hemihydrate where expanded granular bloating mineral and calcium sulfate hemihydrate are mixed to form a granulated product, where the calcium sulfate hemihydrate is converted by the addition of a surplus of water in toto into calcium sulfate dihydrate and where free water is removed by drying.

In a prior-art method (German Patent 30 21 377) of this type, a weight ratio of calcium sulfate to perlite of 5:1 maximum is recommended for the adsorbent and the mixing is effected in a rotating granulating drum whereby substantially round granules are produced with a perlite core and a calcium sulfate dihydrate coating, the granulated product having a total water content of about 18% by weight. The satisfactory adsorption effect of this adsorbent is achieved by the use of a relatively great amount of perlite which is expensive. Also, adequate hardness and abrasion resistance of the adsorbent manufactured according to the prior art method is obtained by the addition of a polyalcohol.

It is an object of the present invention to provide a method of the type initially referred to by means of which an adsorbent can be made where the percentage of bloating mineral is reduced, the adsorption performance is substantially maintained and its hardness is increased without any additive substance. In accomplishing these objectives, the method according to the present invention is characterized in that calcium sulfate hemihydrate and bloating mineral are mixed in such proportion that a weight ratio between calcium sulfate and the bloating mineral >5:1 and up to 10:1 exists in the adsorbent, in that the mixing is effected by calcium sulfate hemihydrate and the bloating mineral being poured together in a tank and stirred there in bulk by means of a stirring mechanism to form a granulated mixture, in that the granulated product mixture after adding the water and before drying is allowed a retention time of at least 4 minutes, and in that such a proportion of the dry calcium sulfate dihydrate is converted by calcining at 120°–200° C. into calcium sulfate hemihydrate that the adsorbent has a total water content of 1% by weight to 16% by weight.

The method according to the invention uses a reduced amount of bloating mineral and represents an adsorbent which, on the one hand, contains particles consisting of an bloating mineral core with a calcium sulfate coating and, on the other hand, particles which consist only of calcium sulfate. The particles of the adsorbent are substantially of a shape other than round and have an open-pore surface. Despite the reduction in the amount of bloating minerals, the total adsorption effect of the adsorbent is maintained due to the additional adsorption effect of the calcined calcium sulfate. A reduction in the total water content by 1% by weight increases the adsorption effect by abt. 3%. Although, in calcining calcium sulfate dihydrate lumps, the hardness of the product normally decreases considerably, this is not so in the case of the method according to the invention. The hardness of the manufactured adsorbent is not less than the hardness of the granulated material before calcining and greater than that of the adsorbent made according to the prior art method.

It is eespecially effective and advantageous if the calcium sulfate hemihydrate and bloating mineral are stirred in such proportion that a weight ratio of calcium sulfate to bloating mineral of 6:1 to 8:1 exists in the adsorbent. With this weight ratio, there is a favourable saving in the amount of bloating mineral and the specific weight of the adsorbent is still not too high. The granular expanded bloating mineral is included in the adsorbent not only because of its adsorbent action, but also in order to reduce the specific weight of the adsorbent within certain limits. In many cases, for instances in producing pet litter, a ratio of 5.5:1–6.5:1, for instance 6:1 is preferred.

Conservative calcining is important for the properties of the adsorbent made by the method according to the invention. It is especially effective and advantageous, therefore, if calcining is effected at 135°–145° C. At these calcining temperatures, improved adsorption effect and hardness are obtained.

A calcining temperature up to 150° C. is in many cases sufficient. A increase in the calcining temperature to, say, 190° C. will abbreviate the time required for the calcining process. Calcining temperatures of 120°–190° C., preferably 160°–180° C. have proved to be especially effective and advantageous.

It is also especially effective and advantageous if the proportion converted into calcium sulfate hemihydrate is such that the adsorbent has a total water content of 6% by weight to 12% by weight. On the basis of such calcining, the adsorbent calcium sulfate which, in addition to hemihydrate, also comprises dihydrate and anhydrite III develops an excellent adsorption effect.

The retention time allowed for the granulated mixture produced with the addition of water after making this granulated mixture and before drying has proved to be specially important for its hardness and abrasion resistance. It is especially effective and advantageous if the granulated mixture is allowed a retention time of up to 8 minutes before drying. During this period of time, the reaction of the water with the calcium sulfate hemihydrate can proceed completely without any disturbance. In practice, a retention time of about 4 minutes is as a rule sufficient in order to obtain a sufficiently hard granulated product and one of up to 5 minutes is still practicable.

The adsorbent made according to the invention can be used for liquids of inorganic or organic origin, e.g. as a binding agent for acids, alkalies or oil which may also be mixed with water. However, the adsorbent is preferably used as a binding agent for animal excretions, e.g. as pets litter.

The expensive proportion of bloating minerals in the finished product can be reduced by more than 50% which amounts to a distinct saving in cost. The adsorbent granulated product is of the open-pore type and has a shape other than round which is important when used as a pets litter because the granulated product will not roll. It is especially effective and advantageous if the adsorbent is produced with a bulk weight of 0.35–0.6 kg/liter, preferably 0.4–0.5 kg/liter because lighter products would be scratched out by the cats from the litter box. The adsorbent according to the invention is harder and will not powder so that the cat after using the litter box will not leave any traces.

The bloating mineral used for the method according to the invention may, for instance, be vermiculite which, in the raw condition is a water-containing mineral in line with the bloating minerals under consideration here. It is especially effective and advantageous, however, if perlite is used as the bloating mineral. Perlite is not yellow or brown, but white and is superior in respect of the properties which the adsorbent to be produced according to the invention is desired to have.

The adsorbent manufactured according to the invention may be used not only for adsorption purposes, but also for other applications, e.g. in the building industry as an aggregate in gypsum-compatible mortar mixtures. It is especially effective and advantageous if the adsorbent made according to the invention is used as granulated building material for filling. This is because this product has positive properties in respect of bulk weight, abrasion, consolidation and strength which make it suitable as a filler.

The total water content can be reduced by calcining to 1% by weight, a decrease in the total water content improving the adsorption effect. It is especially effective and advantageous if a total water content of about 2% by weight, but not above 8% by weight, or of a percentage between these two limits is adjusted by calcining. In this case, strength, bulk weight and adsorption capacity will be in a preferred relationship to each other.

The size of the expanded granular bloating mineral used is 0–6 mm and at least 85% of the granules in the finished adsorbent have a size > 1.25 mm. In this manner, a granulated product is obtained with approximately 95% > 0.8 mm up to 6 mm. As a rule, the adsorbent comprises greater particles which are calcium sulfate-coated bloating mineral particles and smaller particles which consist only of calcium sulfate.

At least 90% of the granules in the bloating mineral used should have a size of 1–6 mm, because smaller dust fractions are undesirable. In the case of the calcium sulfate hemihydrate, at least 80%, preferably at least 90%, should be < 63 μm, For instance, 143 kg of plaster of Paris would be mixed for 60 seconds with 20 kg of expanded perlite in sizes of 50% 0–3 mm and 50% 3–6 mm with 80 liter water added in an Eirich mixer. A surplus of water is added. As a rule, the water is poured into the mixer as a solid stream or flush. The peripheral speed of the stirring mechanism is 6.5 m/s. An open-pore type granulated material is obtained. The moist granulated material is allowed a retention time on a slow-running conveyor prior to drying and calcining.

The drying and calcining equipment is so conceived that the granulated material is subject to minimum friction movements. This is important in order to prevent abrasion of the initially moist material and to preserve the open-pore surface. Therefore, a drum dryer is not suitable while a fluidized-bed drying and calcining installation or a drying and calcining apparatus of the grain dryer type is suitable. Excellent results have been obtained with drying and calcining equipment using a belt dryer comprising a screen-type perforated belt where the carrying run on which the material is deposited has hot gas blown through from below.

The drying and calcining equipment is of the two-stage type. In the drying stage, the free moisture is removed at 80°–100° C., typically 90° C. In the calcining stage, the granulated material is treated with hot air at abt. 130° C. in order to reduce the water of crystallization from abt. 20% to abt. 8%. This step improves the adsorption effect of the finished adsorbent by up to 30% without the hardness and, consequently, abrasion resistance of the finished product being noticeably impaired.

Generally, any suitable mixing apparatus using a stirring tool may be used. It is especially effective and advantageous if mixing is carried out in a rotating container and with the stirring tool arranged eccentrically and rotating in the opposite direction and if the stirring tool is substantially formed by a plurality of wire-type rods which substantially extend in the direction of the rotating axis and are arranged about the rotating axis at a distance from the latter. This configuration enables improved mixing to be achieved in a reduced period of time without too many particles of the material being disintegrated.

The following table is intended to illustrate the influence of the calcination and the perlite proportion on adsorption:

| Perlite content of finished product % | Total H$_2$O content of finished product % | Adsorption % H$_2$O | Bulk density g/l | Fracture resistance after Heberlein N | Abrasion % |
|---|---|---|---|---|---|
| 15 | 17.8 | 80 | 410 | 20–35 | 16 |
| 15 | 10.5 | 100 | 380 | 20–32 | 17 |
| 15 | 8 | 110 | 370 | 20–32 | 18 |
| 12 | 17.9 | 75 | 440 | 25–48 | 7.5 |
| 12 | 10.1 | 95 | 430 | 25–46 | 8.5 |
| 12 | 8.6 | 105 | 410 | 25–45 | 10.5 |

For a comparison, the granulated product obtained according to German Patent 30 21 377 is as follows:

| | | | | | |
|---|---|---|---|---|---|
| 32 | 13 | 109 | 250 | 5–10 | 54 |

In order to determine the adsorption (water adsorption capacity), 110 g of the substance to be tested was filled in a cylinder. This cylinder was closed at the bottom with a sieve. 250 ml water was poured onto the substance to be tested from the top. The amount of water running out was measured in ml. The indication of adsorption of, say, 100% means that 1 kg of the granulated product material is capable of absorbing 1 kg of water.

The fracture resistance test is made with the Heberlein 10 type tablet tester. Granules of the granulated material to be examined with diameters of 1.5–3.5 mm are tested for resistance to fracture. A mean value is derived from the 10 values obtained and stated in terms of fracture resistance in kgf or N.

Abrasion test:

1. 100 g granulated product material is screened on the sieve machine (model Siebtechnik Mühlheim-Ruhr) on 20 cm circular sieves for 5 minutes.

3.5 mm and 250μ sieve and pan material > 3.5 mm and < 250μ is rejected.

2. Of the screened material 250μ–3.5 mm, 50 g plus 300 g steel balls of 6 mm dia are filled in the sieve pan and shaken for 20 minutes in the screening machine.

3. Subsequently, the contents of the pan are poured on a 3.5 mm sieve and the steel balls are removed. The screened material is then placed again on a 250μ sieve and screened for 5 minutes. The material passing through the 250μ sieve is defined as abrasion or attrition.

$$\text{Abrasion (attrition)} = \frac{\text{Passed material (g)} \times 100}{50 \text{ g}} = x \%$$

We claim:

1. A improved method for preparing an adsorbent material that is useful for adsorbing animal excretions wherein a granulated expanded mineral material and calcium sulfate hemihydrate are mixed to form a granulate in which said calcium sulfate hemihydrate is converted to calcium sulfate dihydrate by the addition of excess water, and wherein free water is removed by drying, said improvement comprising:
   (a) mixing calcium sulfate hemihydrate and bloating mineral at a weight ratio of calcium sulfate to bloating material such that the weight ratio of calcium sulfate bloating material in the adsorbent is more than 5 to 1 and up to and including 10 to 1;
   (b) stirring with a stirring tool to form a granulated mixture;
   (c) adding an excess of water and allowing a retention time of at least about 4 minutes; and
   (d) calcining the mixture at 120°–200° C. to convert the dry calcium sulfate dihydrate into calcium sulfate hemihydrate at a proportion such that the resulting adsorbent has a total water content of 1% to 16% by weight.

2. The method of claim 1, wherein the calcium sulfate hemihydrate and bloating minerals are stirred in such proportion that a weight ratio of calcium sulfate to bloating mineral of 6 to 1 to 8 to 1 exists in the adsorbent.

3. The method of claim 1, wherein calcining is effected at 135°–145° C.

4. The method of claim 1 wherein said proportion is such that the adsorbent has a total water content of 6% to 12% by weight.

5. The method of claim 1, wherein the granulated mixture is allowed a retention time of up to 8 minutes prior to drying.

6. The method of claim 1, wherein the adsorbent is made with a bulk weight of 0.35–0.6 kg/l, preferably 0.4–0.5 kg/l.

7. The method of claim 1, wherein perlite is used as a bloating mineral.

8. The method of claim 1 wherein said adsorbent has a total water content by weight of about 2% not exceeding 8% or a water content between these limits wherein said water content is adjusted by calcining.

9. The method of claim 1, wherein a calcining temperature of 120°–190° C., preferably 160°–180° C. is used.

* * * * *